(12) United States Patent
Viyurkov et al.

(10) Patent No.: US 12,377,964 B2
(45) Date of Patent: Aug. 5, 2025

(54) MAGNUS-EFFECT AIRCRAFT AND OPERATING METHOD THEREOF

(71) Applicant: AKTSIONERNOE OBSCHESTVO "ZENTORN", Moscow (RU)

(72) Inventors: Vladimir Alexandrovich Viyurkov, Moscow (RU); Roman Dmitrievich Lebedev, Belgorod (RU)

(73) Assignee: AKTSIONERNOE OBSCHESTVO "ZENTORN", Moscow (RU)

( * ) Notice: Subject to any disclaimer, the term of this patent is extended or adjusted under 35 U.S.C. 154(b) by 0 days.

(21) Appl. No.: 18/551,534

(22) PCT Filed: Aug. 18, 2022

(86) PCT No.: PCT/RU2022/050254
§ 371 (c)(1),
(2) Date: Sep. 20, 2023

(87) PCT Pub. No.: WO2023/027612
PCT Pub. Date: Mar. 2, 2023

(65) Prior Publication Data
US 2024/0166340 A1    May 23, 2024

(30) Foreign Application Priority Data
Aug. 25, 2021   (RU) ................................. 2021125150

(51) Int. Cl.
*B64C 23/08*  (2006.01)
*B64U 30/30*  (2023.01)
*B64U 10/20*  (2023.01)

(52) U.S. Cl.
CPC .............. *B64C 23/08* (2013.01); *B64U 30/30* (2023.01); *B64U 10/20* (2023.01)

(58) Field of Classification Search
CPC .......... B64C 23/02; B64C 23/08; B64U 30/30
See application file for complete search history.

(56) References Cited

U.S. PATENT DOCUMENTS

| | | | | |
|---|---|---|---|---|
| 1,665,533 | A | * | 4/1928 | Dally ..................... B64C 23/08 244/58 |
| RE18,122 | E | * | 7/1931 | Flettner .................. B64C 23/08 415/908 |

(Continued)

FOREIGN PATENT DOCUMENTS

| | | |
|---|---|---|
| RU | 2203199 C2 | 4/2003 |
| WO | 2010043834 A1 | 4/2010 |

OTHER PUBLICATIONS

International Search Report for PCT/RU2022/050254 dated Dec. 1, 2022, 4 pages.

(Continued)

*Primary Examiner* — Timothy D Collins
*Assistant Examiner* — Terri L Filosi
(74) *Attorney, Agent, or Firm* — Nixon & Vanderhye PC

(57) ABSTRACT

An unmanned aerial vehicle for vertical take-off and landing is disclosed. Cylinders installed along its perimeter are rotatable. The body has inlets leading to the gas intake and supply area, where centrifugal impellers are installed at the top and bottom to create a forced gas flow. At the outlet from the gas intake and supply area, and along the perimeter, independent flow channels extend into a tunnel, which narrows at the outlet. The forced air created by rotation of the impellers passes through cells of the flow channels, which allows one continuous flow to split into several smaller ones and evenly distributes the air supply along the cylinders' length. The flows pass through the tunnel and reaches the cylinders. The forced air that flows to the rotating cylinders produces the Magnus effect on each cylinder. The torque of the upper impeller is compensated by the torque of the lower impeller.

20 Claims, 2 Drawing Sheets

(56) References Cited

U.S. PATENT DOCUMENTS

| | | | | |
|---|---|---|---|---|
| 1,875,276 A * | 8/1932 | Steigert | | B64C 23/08 244/10 |
| 1,927,535 A * | 9/1933 | Zaparka | | B64C 23/08 244/10 |
| 1,927,538 A * | 9/1933 | Zaparka | | B63H 9/02 416/4 |
| 1,969,804 A * | 8/1934 | La Fon | | B64C 23/08 244/21 |
| 2,344,515 A * | 3/1944 | Massey | | B64C 23/08 244/21 |
| 2,532,899 A * | 12/1950 | Dubost | | B64C 23/08 416/4 |
| 3,071,334 A | 1/1963 | Barnes | | |
| 3,627,234 A * | 12/1971 | Dziallas | | B64C 23/08 416/4 |
| 3,630,470 A | 12/1971 | Elliott | | |
| 5,180,119 A * | 1/1993 | Picard | | B64C 23/08 244/206 |
| 5,875,627 A * | 3/1999 | Jeswine | | B64C 23/08 60/221 |
| 10,118,696 B1 * | 11/2018 | Hoffberg | | B64C 39/001 |
| 11,414,182 B1 * | 8/2022 | Carnegie | | B64U 30/00 |
| 2006/0124800 A1 * | 6/2006 | Tehrani | | B64C 3/30 244/21 |
| 2016/0327073 A1 * | 11/2016 | Amlani | | F15D 1/007 |
| 2022/0063821 A1 * | 3/2022 | Cass | | B64C 23/069 |
| 2022/0258858 A1 * | 8/2022 | Pfaller | | B64C 11/001 |
| 2022/0387929 A1 * | 12/2022 | Grimes | | B64D 11/02 |
| 2024/0262494 A1 * | 8/2024 | Smith | | B64U 10/60 |

OTHER PUBLICATIONS

Written Opinion of the ISA for PCT/RU2022/050254 dated Dec. 1, 2022, 4 pages.

* cited by examiner

MAGNUS-EFFECT AIRCRAFT AND OPERATING METHOD THEREOF

CROSS-REFERENCE TO RELATED APPLICATIONS

This application is the U.S. national phase of International Application No. PCT/RU2022/050254 filed Aug. 18, 2022 which designated the U.S. and claims priority to RU patent application No. 2021125150 filed Aug. 25, 2021, the entire contents of each of which are hereby incorporated by reference.

TECHNICAL FIELD

The invention relates to the field of aviation, in particular to the design of unmanned aerial vehicles for vertical take-off and landing.

BACKGROUND AND SUMMARY

A known unmanned aerial vehicle (quadcopter) is a radio-controlled aerial apparatus with four propellers that rotate diagonally in opposite directions, with one pair of propellers rotating clockwise and the other rotating counter-clockwise.

The disadvantages of known analogs are small load capacity and the noise generated by the rotation of open propellers.

The task of the inventor was to create a low-noise unmanned aerial vehicle with a high load capacity for vertical take-off and landing.

This task was addressed by the essence of the claimed invention.

The essence of the invention is the ability to increase the load capacity of unmanned aerial vehicles and reduce noise during their operation by using the claimed apparatus with closed propellers (impellers) which, when rotated, create a forced flow of gas (air) directed to the rotating cylinders and, ultimately, produce Magnus effect.

The apparatus is a polyhedral (for example, rectangular) body, with the cylinders 1 installed along its perimeter and capable of rotating. To supply air to the inside of the apparatus, the body has inlets 2 leading to the gas intake and supply area 7 located within the body, where the centrifugal impellers 3 are installed at the top and at the bottom to create a forced flow of gas. At the outlet from the gas intake and supply area 7, as well as along the perimeter, there are flow channels located at the top and at the bottom, which have the form of cells 4 that extend into tunnel 5, which narrows at the outlet just before cylinder 1. The top and bottom flow channels are independent and not connected to each other. All rotating parts of the structure (impellers 3 and cylinders 1) are driven by engines 6 (electric engines, internal combustion engines (ICE)). There can be multiple impellers 3 on each side, at the top and at the bottom. The torque is compensated for by the impellers 3 (those at the top compensate for those at the bottom).

DETAILED DESCRIPTION

Method of Operation of the Apparatus

Figure 1:
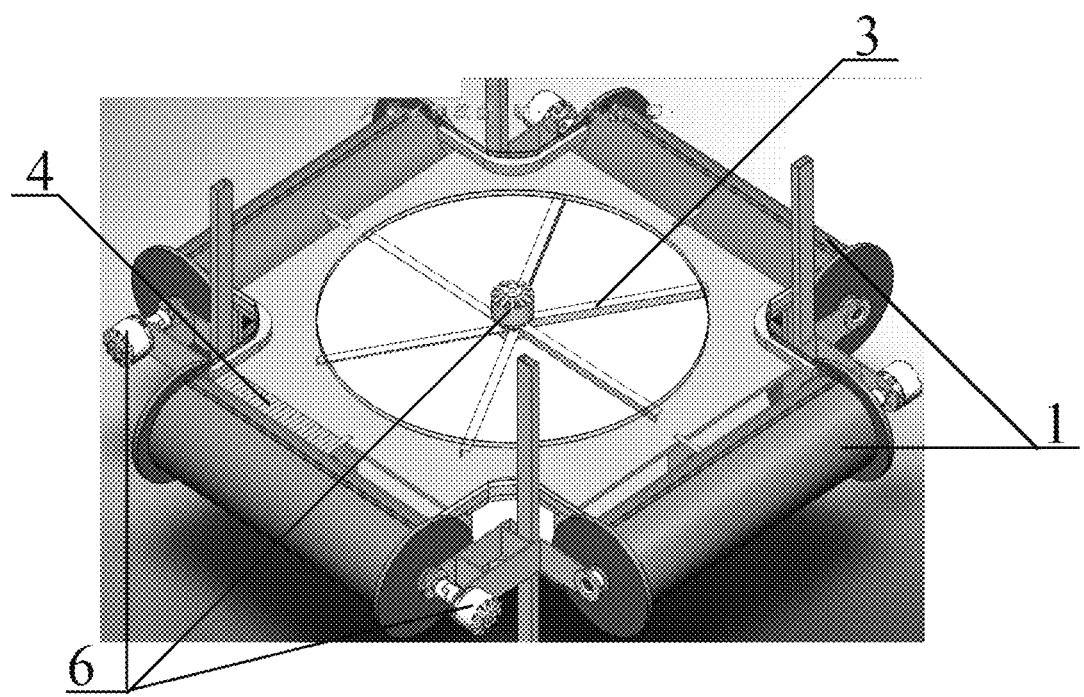
FIG. 1 shows an embodiment of the claimed apparatus with a rectangular body in an axonometric projection.

The gas enters into the body through the inlets 2. When the impellers 3 rotate, this causes the intake and supply of gas. The forced ram air created by the rotation of the centrifugal impellers 3 (shown with arrows on FIG. 2) passes through the cells 4 of the flow channel, which allows one continuous flow to be split into several smaller ones and makes the air supply evenly distributed along the entire length of cylinders 1. After the cells, the flows pass through the tunnel 5 where they become narrower and get to the rotating cylinders 1. The narrowing of the gas flows increases their velocity, but reduces their impact on the cylinder area 1. The forced ram air that flows to the rotating cylinders 1 produces the Magnus effect on each cylinder 1. The torque of the upper impeller 3 is compensated for by the torque of the lower impeller. The torque of each cylinder 1 is coordinated with the torque of all cylinders 1, thereby producing the Magnus effect in one direction. While differing on each cylinder 1 in terms of magnitude, the Magnus effect has the same direction, which allows the velocity and trajectory of the aerial vehicle to be changed.

Figure 2:
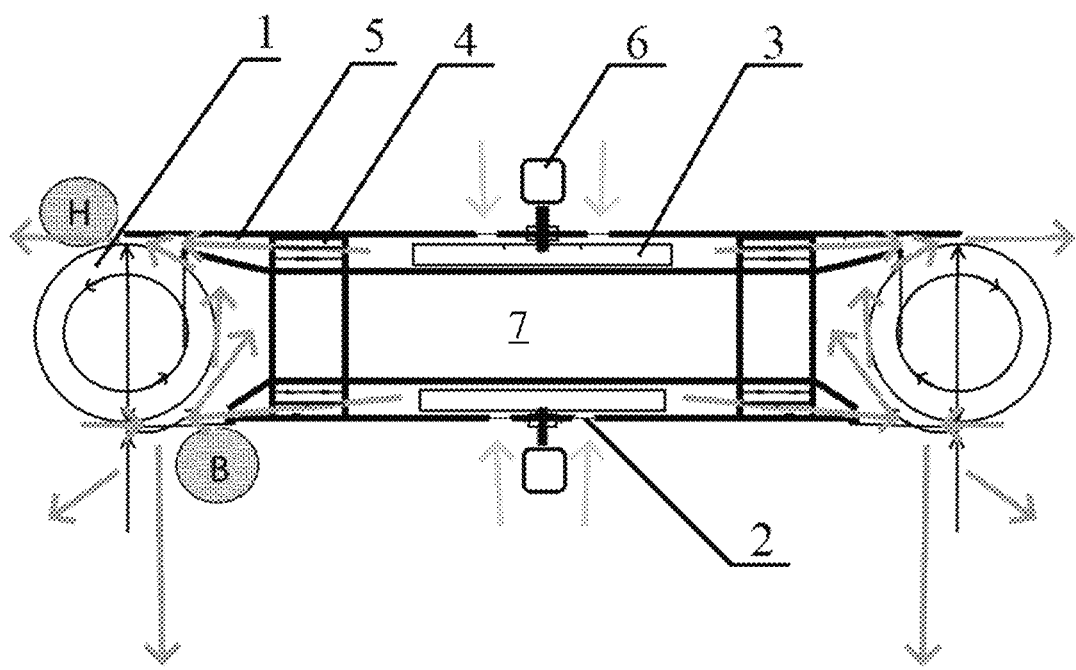
FIG. 2 shows the internal structure of the aerial vehicle with a rectangular body (side view) and the direction of forced flows (shown by arrows). The letters B an H designate the areas of low (B) and high (H) pressure, with the high-pressure area shifting to the left as the velocity of ram air increases.
Figure 3:
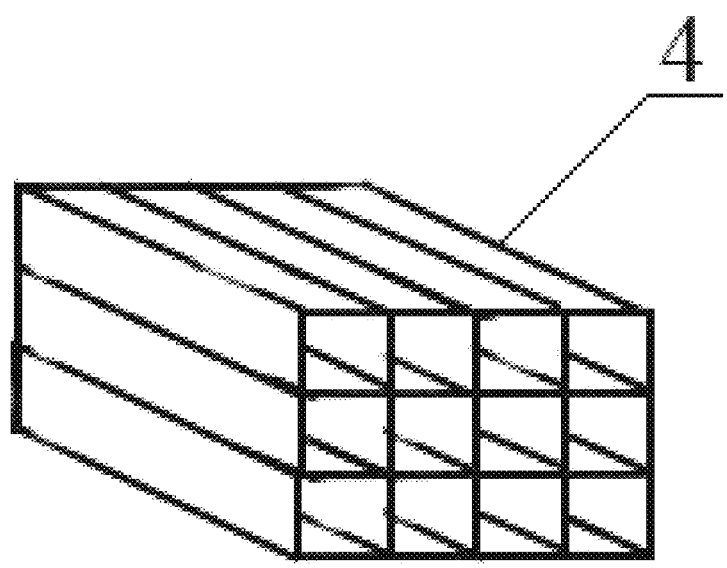
FIG. 3 shows an approximate view of cells.

FIG. 2 shows the distribution of flows at the top and at the bottom of cylinders and, with the design area reduced by half, the narrowing of gas flows increases the velocity of ram air.

$$\rho*(v+u)^2/2+P2=\rho*(v-u)^2/2+P1$$

$$\Delta P=\rho*(v+u)^2/2-\rho*(v-u)^2/2$$

$$\Delta P=\rho/2*((v^2+2*v*u+u^2)-(v^2-2*v*u+u^2))$$

$$\Delta P=\rho/2*4*v*u$$

$$\Delta P=\rho*2*v*u$$

$$F=\Delta P*S/2$$

$$S=2*\pi*R*L$$

$$F=\Delta P*2*\pi*R*L/2$$

$$F=\rho*2*v*u*2*\pi*R*L/2$$

$$F=\rho*v*u*2*\pi R*L \qquad [1]$$

Where:
$\rho$ is the flow density;
v is the cylinder velocity;
u is the flow velocity;
P2 and P1 indicate static flow pressure at the top and at the bottom of the cylinder;
$\Delta P$ is the pressure difference between the top and bottom of the cylinder;
S is the surface area of the cylinder;
F is the thrust produced by the Magnus effect;
R is the cylinder radius;
L is the cylinder length;
Since v=w*R, where w is the angular velocity of cylinder rotation, then $$F=\rho*w*u*2*\pi*R^2*L$$

Model Calculation (Example):
  Diameter of each cylinder: 0.1 m;
  Length of each cylinder: 0.5 m;
  Rotation of cylinders: 6000 rpm;
  Velocity of the ram air created by the impeller rotation: 17 m/sec;
  The Magnus force will be equal to 431.8 N.

The invented apparatus can be controlled by positioning the cylinders and by changing the Magnus force on each cylinder. Also, if the torque is controlled at the intake and distribution of flows, this allows to ensure the rotation in additional (horizontal) plane.

The claimed invention can be used for reconnaissance, cargo delivery, transportation of people and machines (if the apparatus is made larger and more powerful), construction, meteorology, emergency medical aid, postal service, etc. Also, the claimed apparatus can operate by creating a forced flow of not only gas, but also liquid, i.e. it can operate under water.

The low-noise operation during flight is ensured by the absence of external propellers. A greater load capacity is enabled by the Magnus effect.

Therefore, the task set for the inventor has been completed.

The invention claimed is:

1. An aerial vehicle, comprising:
  a polyhedral body;
  rotatable cylinders installed along perimeter edges of the body;
  a gas intake and supply area located within the body;
  inlets leading to the gas intake and supply area;
  centrifugal impellers installed at a top and at a bottom of the gas intake and supply area, wherein the rotatable cylinders and the centrifugal impellers are drivable by engines; and
  top and bottom flow channels located along two of the perimeter edges of the body at the top and at the bottom of the gas intake and supply area, respectively, the flow channels being formed as cells that extend into tunnels that narrow at outlets of the gas intake and supply area before the cylinders,
  wherein the top and bottom flow channels are independent and not connected to each other, and
  wherein forced air that flows to the rotatable cylinders produces a Magnus effect on each of the cylinders.

2. The aerial vehicle of claim 1, wherein torque of the impeller at the top of the gas intake and supply area is compensated for by torque of the impeller at the bottom of the gas intake and supply area.

3. The aerial vehicle of claim 2, wherein the Magnus effect produced is variable in magnitude from cylinder-to-cylinder.

4. The aerial vehicle of claim 3, wherein the Magnus effect produced has a common direction for all of the cylinders.

5. The aerial vehicle of claim 1, being configured to vertical take-off and landing.

6. The aerial vehicle of claim 1, wherein the body is rectangular.

7. The aerial vehicle of claim 1, wherein multiple impellers are provided on each side of the body.

8. The aerial vehicle of claim 1, wherein all impellers are internal to the body.

9. The aerial vehicle of claim 1, wherein the impellers are driven by a first engine and the cylinders are driven by a second set of engines different from the first engine.

10. The aerial vehicle of claim 1, wherein the flow channels are provided between the cylinders and the perimeter edges of the body.

11. The aerial vehicle of claim 1, wherein one of the cylinders is provided adjacent to each perimeter edge of the body, and one of the flow channels is provided between each of the cylinders and the adjacent perimeter edge.

12. The aerial vehicle of claim 1, wherein gas feedable into the inlets is ram air.

13. A method of operating an aerial vehicle, the method comprising:
  rotating centrifugal impellers to facilitate intake of ram air into a body of the aerial vehicle through inlets of the body, the centrifugal impellers including at least an upper impeller and a low impeller, rotating cylinders being provided along outer edges of the body, and flow channels being provided between the rotating cylinders and the outer edges of the body,
  wherein the rotation of the centrifugal impellers further generates forced ram air that is passed through cells of the flow channels such that the forced ram air is split from a continuous flow into multiple smaller flows that are evenly distributed along the cylinders' lengths;
  wherein downstream of the cells, the multiple smaller flows are passed through narrowing tunnels and towards the rotating cylinders, such that velocities of the multiple smaller flows accelerate along the narrowing tunnels; and
  wherein the forced ram air produces a Magnus effect on each cylinder, wherein torque of upper impeller is compensated for by torque of lower impeller.

14. The method of claim 13, wherein the Magnus effect produced is variable in magnitude from cylinder-to-cylinder.

15. The method of claim 14, wherein the Magnus effect produced has a common direction for all of the cylinders.

16. The method of claim 13, wherein multiple impellers are provided on each side of the body.

17. The method of claim 13, wherein all impellers are internal to the body.

18. The method of claim 13, wherein the impellers are driven by a first engine and the cylinders are driven by a second set of engines different from the first engine.

19. The method of claim 13, wherein the one cylinder is provided for each perimeter edge of the body.

20. The method of claim 13, wherein the aerial vehicle is designed for vertical take-off and landing.

* * * * *